United States Patent
Couture

[15] 3,673,859
[45] July 4, 1972

[54] MAGNETIC PULSER CIRCUIT FOR MATERIAL TESTER

[72] Inventor: John W. Couture, Danbury, Conn.

[73] Assignee: Automation Industries, Inc., Los Angeles, Calif.

[22] Filed: May 13, 1971

[21] Appl. No.: 143,211

Related U.S. Application Data

[63] Continuation of Ser. No. 794,053, Jan. 27, 1962, abandoned.

[52] U.S. Cl. .................................... 73/67.8 R, 328/67
[51] Int. Cl. ..................................................... G01n 29/00
[58] Field of Search ........................ 73/67.8, 67.9; 307/268; 328/65, 67, 53, 54

[56] References Cited

UNITED STATES PATENTS

| | | | |
|---|---|---|---|
| 3,237,446 | 3/1966 | Wood | 73/67.9 |
| 3,486,043 | 12/1969 | Johannessen | 328/67 |
| 3,496,476 | 2/1970 | Farrell | 328/67 |

OTHER PUBLICATIONS

G.E. Transistor Manual, 1964, pp. 200-203

Primary Examiner—Richard C. Queisser
Assistant Examiner—Arthur E. Korkosz
Attorney—Dan R. Sadler

[57] ABSTRACT

A high voltage magnetic pulser circuit is described which is used, for example, in an ultrasonic nondestructive material testing system. The circuit includes a saturable core transformer which is driven into saturation by the output of a synchronized pulse multivibrator at repetitious intervals. Upon saturation the output voltage on the secondary winding of the transformer has reached a relatively high voltage. Thereafter, the sharp down slope of the voltage creates the leading edge of the pulse and induces a resonant circuit coupled thereto into oscillation. Because of the high level of the signal induced into the resonant circuit from the transformer, the inductor therein also saturates and the trailing edge of the pulse is sharply established. After saturation the resonant circuit is caused to quickly discharge, and thus provide a low impedance to an attached L.C. tuned circuit or the like. The result is a high voltage pulse at a desired frequency.

18 Claims, 3 Drawing Figures

INVENTOR
John W. Couture

ATTORNEY

MAGNETIC PULSER CIRCUIT FOR MATERIAL TESTER

CROSS REFERENCE TO RELATED APPLICATION

This is a Continuation of co-pending application Ser. No. 794,053 filed Jan. 27, 1969, now abandoned for Magnetic Pulser Circuit for Material Tester on behalf of John W. Couture.

BACKGROUND OF THE INVENTION

A. Field of the Invention

This invention relates to an electrical pulse generator, and more particularly to a novel and improved pulser useful in generating magnetic pulses for an ultrasonic nondestructive material tester or the like.

B. Description of the Prior Art

In the prior art there is provided electrical nondestructive test equipment which generates ultrasonic vibrations by use of a crystal transducer. The vibrations from the transducer are then sent in the form of an acoustical pulse beamed into the workpiece being tested. The beam travels unimpeded through the workpiece and reflects back from the surfaces thereof. Any flaw, defect or any other discontinuity in the workpiece also causes reflections of the acoustical beam back to the instrument which indicates the location and size of the discontinuity on a display, such as an oscilloscope.

The echo return energy is amplified and displayed on the oscilloscope as vertical spikes. The screen on the oscilloscope shows spikes of the initial pulse, the defect, and the back and front surface reflections of the workpiece. Spacing of the spikes on the scope is in proportion to the distance the beam travels and the material tested, thus, locating the position of any flaw by irregular spaced spikes.

In order to generate proper electrical pulses to be transmitted to the search unit and to cause the transducer therein to vibrate, a pulse generator is necessary to generate a high voltage, high frequency pulse. Heretofore, prior art devices included the use of a thyratron tube in order to generate these pulses. Such thyratron pulsers are undesirable because of their slow speed, slow warm up time, their unreliability and their expensive cost. Further, these earlier ultrasonic pulsers had a slow pulse repetition frequency because of their use of electronic discharge tubes, such as the thyratron. They were normally large in size and were dependent upon the active element parameters for their rise times. Because of the above stated limitations, the prior art pulse generators are considered quite expensive for real high speed material testing units such as those now in present use.

SUMMARY OF THE INVENTION

Briefly described the present invention includes means for forming a synchronized pulse such as an oscillator and shape the pulse to have a fall time at a predetermined interval. A saturable core step-up transformer is provided which includes an input winding coupled to receive the pulses provided by the source at the repetitiously spaced intervals. The transformer is saturated by the pulse from the source at these predetermined times. A resonant circuit is provided and coupled to the output winding of the transformer and is adapted to oscillate for a predetermined interval and saturate thereafter. Means are provided for discharging the resonant circuit upon saturation thereof and whereby the saturation of the transformer and the oscillation and discharging of the resonant circuit establish the high voltage pulse.

One feature of this invention is that a circuit is provided to accommodate high voltage levels without the use of expensive electron discharge tubes, such as the thyratron, or expensive high voltage transistors. The resolution is improved both by the shorter minimum pulse length and by cessation of low level ringing at a sooner time interval for both minimum and maximum pulse lengths. By proper control of the parameters of the circuit, both rise and fall times are easily controlled which provides for more efficient excitation of the crystal in the search unit. This contrasts with the exponential fall now provided on the prior art pulsers.

A further feature of this invention is the circuit provides a low power consumption and operates at a lower temperature.

DESCRIPTION OF THE DRAWINGS

These and other features and advantages will become more apparent to those skilled in the art when taken into consideration with the following detailed description, wherein like reference numerals indicate like and corresponding parts throughout the several views, and wherein.

DESCRIPTION OF A PREFERRED EMBODIMENT

Figure 1:
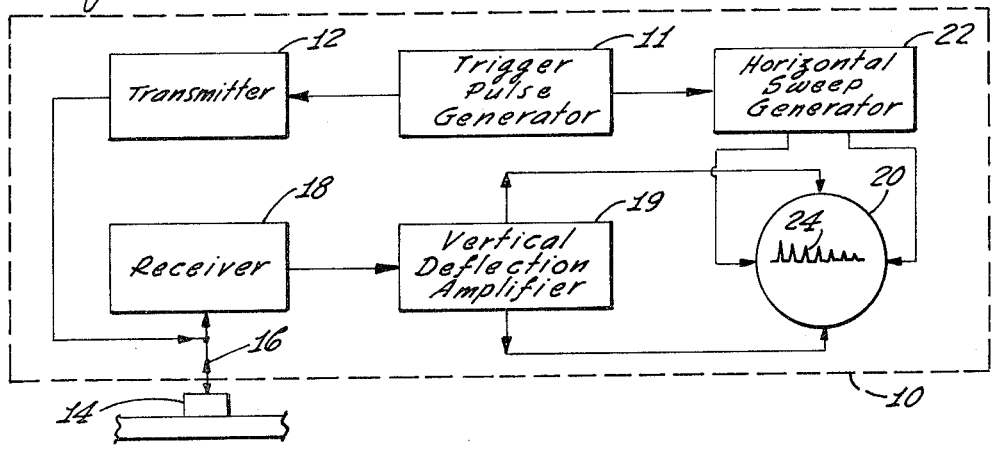
FIG. 1 is a block diagram of an ultrasonic nondestructive testing system.

Turning now to FIG. 1 there is shown a nondestructive testing instrument 10 which produces a series of intermittently occurring high voltage, high frequency pulses as will be explained in more detail in connection with FIG. 3. Pulse generator 11 is coupled to a transmitter 12 which transmits these high frequency pulses into the search unit 14. The transmitter 12 may be coupled to the search unit 14 by a coaxial cable 16. The pulses emitted by the transmitter 12 excite the transducer 16 within the search unit 14 whereby corresponding pulses of electrosonic energy are transmitted therefrom.

Echoes from the pulses are received by the search unit 14 whereby a corresponding electrical signal is produced therefrom. This corresponding electrical signal is returned through the cable 16 to receiver 18. The receiver 18 is coupled to a vertical deflection generator 19, which in turn is coupled to an oscilloscope 20. The pulse generator 11 is also coupled to a horizontal sweep generator 22, which in turn is also coupled to the oscilloscope 20. The results of the output of the vertical deflection generator are reflected by the receiver 18, and the results obtained in conjunction with the signal from the horizontal sweep generator 22 are displayed as the display 24 as exhibited on the face of the oscilloscope 20. The display 24 on the oscilloscope 20 reflects the return energy in the form of spikes indicative of the initial pulse, the front surface reflections, the defects, and the back surface reflections from the material being tested. Spacing of the spikes is in proportion to the distance of the reflections from the material under test. Any random spike which appears between the initial spacing is indicative of flaws, defects or other discontinuities in the workpiece. Thus, the presence and location of these flaws are identifiable by the random spikes between the initial return spikes.

Figure 2:
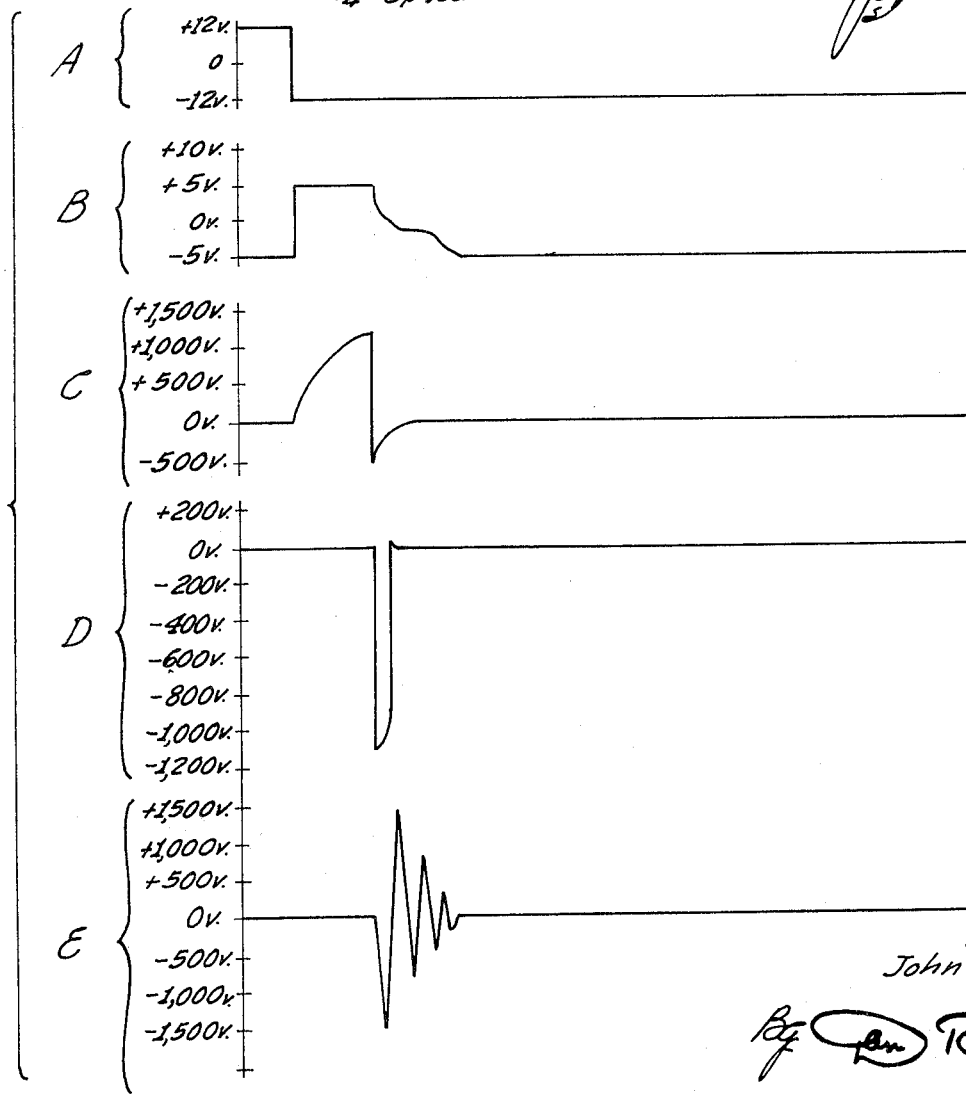
FIG. 2 is a graph illustrating the wave form of the pulse as it is formed in the pulse generator of FIG. 1.
Figure 2:
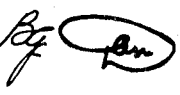
Figure 3:
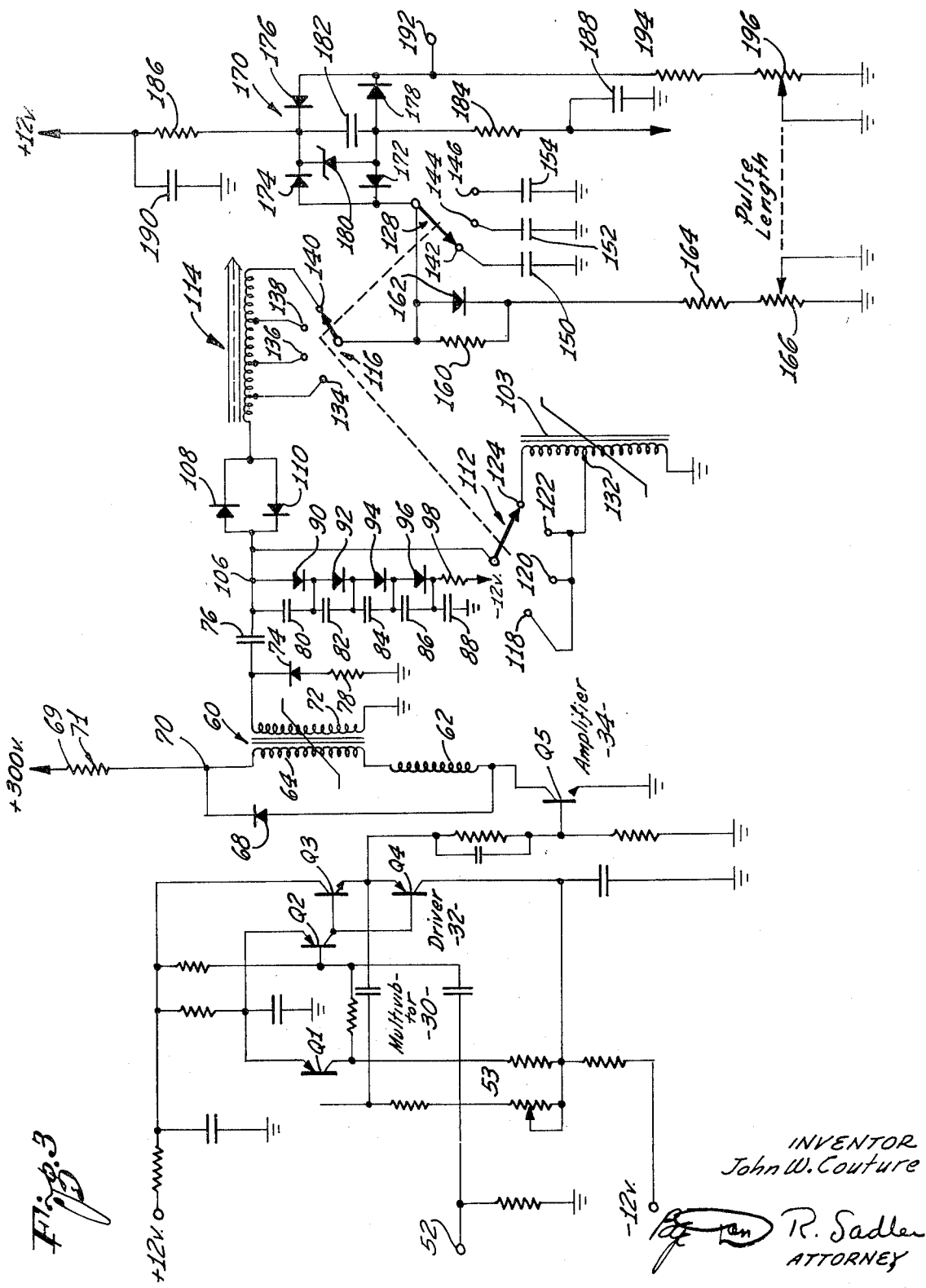
FIG. 3 illustrates an electrical schematic of the pulse generator of FIG. 1.

With reference now to FIG. 3 there is shown an input terminal 52 which is coupled to a source of repetitiously spaced electrical pulses, as shown in Graph A of FIG. 2. The terminal 52 is coupled to a multivibrator 30 which is comprised of the transistors Q1 and Q2 shown therein. The multivibrator 30 supplies pulses of predetermined pulse widths, as shown in Graph B of FIG. 2. The pulse width can be varied by the variable resistor 53. The signal from the multivibrator 30 is then applied to a driver circuit 32 which drives the pulses to a higher level before applying them to amplifier 34. The amplifier 34 amplifies the pulses from the driver 32 to approximately 300 volts and applies them to a transformer 60.

The transistor Q5 of the amplifier 34 has its collector coupled through an inductor 62 to one leg of the secondary winding 64 of the transformer 60. A diode 68 is coupled between the collector of the transistor Q5 of the amplifier 34 and the other leg of the secondary winding 64 of transformer 60. For this embodiment the terminal 70 may have 300 volts applied thereto. The inductor 62 limits the current the amplifier 34 delivers to the transformer 60 when in magnetic saturation. The diode 68 limits the voltage overshoot on the turn off of the amplifier 34.

Q5 which forms the amplifier 34 drives the transformer 60 from the 300 volts on the terminal 71 to a high voltage (for example 1,100 volts) on the secondary winding 72 thereof. Because of the high voltage the transformer 60 saturates shortly thereafter. The saturation generates the leading edge of the output pulse. With reference to Graph C FIG. 2, there is shown the wave form appearing on the secondary winding 72 which exhibits a rapid collapse of voltage at the time of saturation of the transformer 60.

One end of the secondary winding 72 of transformer 60 is coupled to a ground reference, and the other end is coupled to the cathode of a diode 74 and to one electrode of a capacitor 76. The anode of diode 74 is coupled through a resistor 78 to the ground reference. The other electrode of capacitor 76 is coupled to a plurality of series coupled capacitors 80, 82, 84, 86 and 88 to the ground reference. A plurality of corresponding series coupled diodes 90, 92, 94 and 96 are coupled between the capacitor 76 and a −12 volt source through a resistor 98. Each diode 90, 92, 94, and 96 is coupled in parallel with a corresponding capacitor 80, 82, 84, and 86, respectively. The diode 74 and resistor 78 act as a selective damping network for negative secondary voltages provided on the secondary winding 72 of transformer 60. The value of resistor 78 is determined by the damping overshoot of the signal, for example 33 Ohms. The capacitor 76 stores the secondary voltage from transformer 60 prior to saturation of the transformer. The diodes 90, 92, 94 and 96 prevent positive signals from passing the positive portion of the wave form shown in Graph C in FIG. 2 with the amplified results as set forth in the wave form shown in Graph D in FIG. 2. The capacitors 80, 82, 84 and 86 balance the drop on the diodes 90, 92, 94 and 96 to regulate the conductance thereof.

A saturable core inductor 103 has one end coupled to a junction 106 between the capacitor 76 and the series coupled diodes 90, 92, 94 and 96. The other end of inductor 103 is coupled to a ground reference. Inductor 103 aids in shaping the exciting pulse. When saturating inductor 103 generates the trailing edge of the exciting pulse. After saturating transformer 60 discharges through diodes 90, 92, 94 and 96 which are now a low impedance path to ground.

The saturation action of the transformer 60 generates the front edge of the exciting pulse as exhibited by the sharp fall of the wave form shown in Graph C, which in turn is the front edge of the exciting pulse shown in Graph D. The junction 106 which appears between the diodes 76 and the capacitors 80, 82, 84, 86 and 88 and the diodes 90, 92, 94 and 96 are coupled to a pair of back-to-back diodes 108 and 110 and also coupled to a switch 112. The other end of the back-to-back coupled diodes 108 and 110 is coupled to an inductor 114 which has a plurality of tapped outputs which is operable with a switch 116. The diodes 108 and 110 reject noise generated by the turn off of transformer 60 and diode 74 and also reduces noise generated by inductor 103.

The switch 112 is operable with a plurality of terminals 118, 120, 122 and 124 and is adapted to couple the junction 106 to a selected one of these terminals. The switch arm 112 is mechanically coupled to the switch arm of the switch 116, which in turn is mechanically coupled to the switch arm of a switch 128.

The saturable core inductor 103 has one end coupled to the switch terminal 124 and includes a tap 132 coupled to the terminals 118, 120 and 122. The other end of the saturable core inductor 103 is coupled to the ground reference.

The switch arm of the switch 116 is adapted to be positioned on one of the terminals 134, 136, 138 and 140 which are coupled to respective output taps of the transformer 114. The switch arm of the switch 116 is electrically and mechanically coupled to the switch arm of the switch 128. The switch arm of the switch 128 is adapted to be positioned to a selected terminal 142, 144 or 146. Terminal 142 is coupled through a capacitor 150 to the ground reference. Terminal 144 is coupled through a capacitor 152 to a ground reference. Terminal 146 is coupled through a capacitor 154 to the ground reference. Inductor 103 and a selected one of the capacitors 150, 152 and 154 form a resonant circuit and will resonate during the saturation period of the transformer 60. The selection is responsible for generating the proper frequency on the output pulse as set forth in Graph E of FIG. 2. After saturation of transformer 60 the capacitor 76 transfers its stored voltage to inductor 103 and aids in the saturating action of both inductor 103 and transformer 60.

The capacitor 88 and resistor 98 generate a negative current source to aid in resetting inductor 103 after saturation. The capacitor 88 and resistor 98 also maintain a forward bias on diodes 90, 92, 94 and 96 thereby eliminating turn off noise generated by transformer 60 and diode 74. The current source provided by capacity 88 and resistor 98 is overcome when capacitor 76 is transferring its stored voltage to the inductor 103.

A resistor 160 has one leg coupled to the junction between the switch arms of switches 116 and 128 and to the anode of a diode 162. The cathode of the diode 162 is coupled to the other leg of the resistor 160 and through a resistor 164 to one end of a potentiometer 166, the end of which is coupled to the ground reference.

A diode bridge 170 comprises the diodes 172, 174, 176 and 178 and the zener diode 180 and capacitor 182. The switch arm of switch 128 is coupled to the junction between diodes 172 and 174. The junction between diodes 172 and 178 is coupled through a resistor 184 to the −12 voltage source and the junction between diodes 174 and 176 is coupled through a resistor 186 to a +12 voltage source. Capacitors 188 and 190 are provided to the resistors 184 and 186 respectively, to provide a constant current source through the bridge 170. The bridge 170 is provided to remove the undesired noise created by the preceding components. Also causes cessation of low level ringing at a sooner time interval for both minimum and maximum pulse length. The junction between the diodes 176 and 178 provides the output circuit to the output terminal 192 which provides the output pulse created to the transducer 14 for providing the corresponding ultrasonic pulse into the workpiece.

The junction between diode 176 and 178 is also coupled through resistor 194 and variable resistor 196 to the ground reference. The resistors 196 and 166 may be in the form of rheostats which have their wiper arms mechanically ganged together. By moving the wiper arms of the rheostats, the length of the pulse on the output terminal 192 may be varied accordingly.

In summation it has been shown that the transformer 60 receives pulses in a synchronized order from the multivibrator 30 through the driver 32 and amplifier 34. The pulse is stepped-up on the secondary winding 72, and the transformer 60 thereafter saturates when the voltage reaches a predetermined level. A resonant circuit comprised of the inductors 103 and 114 and the capacitor 76 goes into an oscillatory transient. The inductor 103 cannot, however, withstand this level of oscillation with capacitor 76 and responds by sustaining only a portion of the oscillation cycle and then saturating. The time relationship between the saturation of transformer 60, partial oscillation of capacitor 76 with inductor 103, and the subsequent saturation of inductor 103 provides the necessary pulse width for each output pulser frequency. The inductor 103 after saturating then begins to discharge through diodes 90, 92, 94 and 96 and through resistor 98. These diodes, now forward biased, provide a low impedance path and assist in a fast fall time on the pulse.

By manipulation of the switches 112, 116 and 128 the resonant frequencies and charge and discharge times of the components thereof are changed. Thus the shape of the wave form is changed accordingly. The saturation of inductor 103 controls the trailing edge of the pulse in combination with the inductor 114 controls the resonant frequency which in turn controls the pulse width.

After the pulse signal has been formed it is transmitted by transmitter 12 into the transducer 14 for use in material testing. The signal transmitted is now the desired high frequency, high voltage pulse and readily available at faster intervals.

Having thus described but one preferred embodiment of his invention, what is claimed is:

1. The combination of
   a source of timing pulses,
   a square wave generator coupled to said source and effective to provide a square wave in response to each of said timing pulses,
   a saturable core transformer,
   a primary in said transformer coupled to said square wave generator for receiving the square waves therefrom, the core of said transformer being effective to saturate when the square wave reaches a predetermined level,
   a secondary in said transformer,
   a saturable core inductor coupled to said secondary of said transformer, the core of said inductor being adapted to saturate a predetermined time after the core of said transformer saturates,
   a resonant circuit coupled to said inductor and to said secondary, said circuit being effective to resonate for a predetermined time when the signal induced in said secondary attains a predetermined level, and
   an ultrasonic transducer coupled to said resonant circuit and responsive to the signal therefrom for transmitting ultrasonic energy.

2. The combination of claim 1 including
   means for varying the resonant frequency of said circuit.

3. The combination of claim 1 including
   a plurality of discharge diodes coupled to said resonant circuit and effective to conduct when said inductor saturates.

4. The combination of claim 3 including
   a receiver coupled to said transducer.

5. A nondestructive test system for inspecting workpieces including
   a source of timing pulses,
   a saturable core transformer having an input winding and an output winding, said input winding being coupled to said source for receiving said timing pulses for establishing the leading edge of a higher voltage pulse,
   a resonant circuit coupled to the output winding of said transformer, said circuit being adapted to resonate for a predetermined time when the signal induced into the output winding of said transformer attains a predetermined level for establishing the traling edge of the higher voltage pulse,
   a search unit for being acoustically coupled to the workpiece, said search unit being coupled to the resonant circuit for transmitting corresponding ultrasonic vibrations into the workpiece and for receiving echoes of the ultrasonic energy and for providing corresponding electrical signals,
   receiving means responsive to said transducer for receiving the corresponding electrical signals, and
   display means coupled to said receiving means for providing a display indicative of the electrical signals from said receiving means.

6. The nondestructive test system as defined in claim 5 including
   means for discharging said resonant circuit after said resonant circuit has resonated for a predetermined time for establishing the trailing edge of the higher voltage pulse.

7. A nondestructive test system for inspecting workpieces including
   a source of timing pulses,
   a saturable core transformer having an input winding and output winding, said input winding being coupled to said source and responsive to said timing pulses for establishing the leading edge of a higher voltage pulse,
   a resonant circuit coupled to the output winding of said transformer, said circuit being adapted to resonate in response to the signal induced into the output winding of said transformer,
   an inductor coupled to the output winding of said transformer, said inductor being effective to saturate after a predetermined time for establishing the trailing edge of the higher voltage pulse,
   a search unit for being acoustically coupled to the workpiece, said search unit being coupled to the resonant circuit and responsive to said higher voltage pulse for transmitting ultrasonic energy into the workpiece,
   said search unit being effective to receive echoes of the ultrasonic energy returning from the workpiece for providing corresponding electrical signals,
   receiving means coupled to said search unit for receiving the corresponding electrical signals, and
   display means coupled to said receiving means and responsive to said signal for providing a display indicative of the electrical energy received by said receiving means.

8. The nondestructive testing system as defined in claim 5 including
   means for varying the resonance frequency of said resonant circuit.

9. A nondestructive test system for inspecting a workpiece including
   a saturable core transformer having a primary and a secondary, said primary being adapted to receive a series of timing pulses, said secondary being adapted to provide a high level output signal in response to each timing pulse, the core of said transformer being adapted to saturate each time a timing pulse reaches a predetermined level,
   a resonant circuit coupled to said secondary and effective to resonate for a predetermined time when said high level output signal in said secondary attains a predetermined level,
   an inductor coupled to said secondary and effective to saturate after a predetermined time,
   diode means coupled to the secondary of said transformer and effective to conduct when said inductor saturates,
   a search unit for being acoustically coupled to the workpiece, said search unit being coupled to said diode means for transmitting ultrasonic energy into the workpiece corresponding to the resonance in said circuit and for receiving echo returns of ultrasonic energy and for providing an electrical signal corresponding thereto, and
   receiving means coupled to said search unit for receiving the corresponding electrical energy.

10. A nondestructive test system as defined in claim 9 including
    a source of timing pulses,
    a monostable multivibrator coupled to said source and adapted to receive said timing pulses and to provide output pulses of predetermined pulse widths, and
    an amplifier coupled to said monostable multivibrator and to said primary, said amplifier being adapted to amplify the output pulses of said monostable multivibrator and apply said pulses to the primary in said saturable core transformer.

11. A nondestructive test system as defined in claim 9 including
    means for varying the resonance frequency of said resonant circuit.

12. A nondestructive test system as defined in claim 9 including
    display means coupled to said receiving means for providing a display indicative of the electrical signal received by said receiving means.

13. A nondestructive test system as defined in claim 9 including
    means for varying the resonance frequency of said resonant circuit, and
    display means coupled to said receiving means for providing a display indicative of the electrical signal received by said receiving means.

14. A nondestructive test system as defined in claim 9 including
    a source of timing pulses, a monostable multivibrator coupled to said source to receive said timing pulses from said source and to provide output pulses of predetermined pulse width, an amplifier coupled to said source and effective to amplify the output pulses of said monostable multivibrator, said amplifier being coupled to said primary for supplying said amplified signal to said saturable core transformer, and means to vary the resonance frequency of said resonant circuit.

15. The nondestructive test system as defined in claim 14 including display means coupled to said receiving means for providing a display indicative of the electrical signal received by said receiving means.

16. A nondestructive test system for inspecting a workpiece including a search unit for being acoustically coupled to the workpiece and transmitting ultrasonic energy into the workpiece in response to a driving signal, first inductive means having a saturable core, a source of timing signals coupled to said first inductor means for supplying the timing signals thereto whereby a second signal is produced in the winding means, said timing signal being large enough to saturate said core, second inductive means having a saturable core, said second inductive means being coupled to the first inductive means and responsive to the second signal whereby a driving signal is produced in the second inductive means, said second signal being large enough to saturate the second core, and means coupling the second inductive means to the search unit for supplying said driving signal thereto.

17. A nondestructive test system for inspecting a workpiece including a search unit for being acoustically coupled to the workpiece and transmitting ultrasonic energy into the workpiece in response to a driving signal, a transformer having a saturable core together with an input winding and an output winding, a source of timing pulses coupled to said input winding for supplying timing pulses thereto whereby a higher voltage pulse is produced in the output winding, said timing pulses being large enough to saturate the core of said transformer, and a driving circuit coupled to the output winding of said transformer and responsive to the higher voltage pulses to provide a series of driving signals, said driving circuit being coupled to the search unit for supplying said driving signals thereto.

18. A nondestructive test system for inspecting a workpiece including a search unit for being acoustically coupled to the workpiece and transmitting ultrasonic energy into the work piece in response to a driving signal, a transformer having a saturable core together with an input winding and an output winding, a source of timing pulses coupled to said input winding for supplying a timing pulse thereto whereby a higher voltage pulse is produced in the output winding, said timing pulses being large enough to saturate the core of said transformer, second inductive means with a saturable core and winding means, said winding means being coupled to the output winding of said transformer and responsive to the higher voltage pulses therefrom to thereby provide a driving signal in the winding means, said higher voltage pulse being large enough to saturate the second core, and a driving circuit coupling the second inductive means to the search unit for supplying said driving signal thereto.

* * * * *